United States Patent
Johnson

(10) Patent No.: US 6,802,568 B1
(45) Date of Patent: Oct. 12, 2004

(54) SEGMENTED BEAM AIRCRAFT PASSENGER SEAT

(75) Inventor: Glenn A. Johnson, King, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 10/424,463

(22) Filed: Apr. 28, 2003

(51) Int. Cl.[7] ................................................ A47C 7/02
(52) U.S. Cl. ............................ 297/452.2; 297/452.13
(58) Field of Search ..................... 297/452.18, 452.2, 297/452.13; 244/122 R, 129.1; 248/346.01

(56) References Cited

U.S. PATENT DOCUMENTS

| | | | |
|---|---|---|---|
| 3,544,164 A | * | 12/1970 | Ohta |
| 4,598,950 A | * | 7/1986 | Fourrey |
| 5,553,923 A | * | 9/1996 | Bilezikjian |
| 5,560,683 A | | 10/1996 | Penley et al. |
| 5,567,017 A | * | 10/1996 | Bourgeois et al. |
| 5,568,961 A | * | 10/1996 | Colasanti |
| 5,660,443 A | * | 8/1997 | Pedronno |
| 5,735,578 A | | 4/1998 | Penley |
| 5,775,642 A | | 7/1998 | Beroth |
| 5,882,067 A | * | 3/1999 | Carbajal et al. |
| 5,988,756 A | * | 11/1999 | Aufrere et al. |
| 6,059,364 A | | 5/2000 | Dryburgh et al. |
| 6,347,836 B1 | * | 2/2002 | Hayotte |
| 6,352,311 B1 | * | 3/2002 | Hayotte |

OTHER PUBLICATIONS

D.J. Sypeck and H.N.G. Wadley; "Cellular Metal Truss Cork Sandwich Structures"; Abstract—Metfoam Issue; Aug. 2002; pp. 1–16; ; Advanced Engineering Matterials; Charlottesville, VA.

* cited by examiner

Primary Examiner—Milton Nelson, Jr.
(74) Attorney, Agent, or Firm—Adams Evans P.A.

(57) ABSTRACT

A passenger seat movable from an upright to a recline position without encroaching on an aft-seated passenger, and including a seat base for being attached to a supporting surface. A unitary seating element is provided and includes a pair of laterally-spaced apart seat frames carried by the seat base, the seat frames defining a curved shape corresponding to the profile of an anatomically-appropriate seat bottom and seat back. A curved, semi-rigid diaphragm support is carried between the seat frames in alignment with the curved shape of the seat frames and mounted for movement relative to the seat frames between a first, upright position and a second, reclined position. A diaphragm is positioned under tension on the diaphragm support for providing a continuous seat bottom and seat back support surface for a seat occupant. Stretchers are attached to and extend between opposite sides of the diaphragm support for maintaining the diaphragm support in a spaced-apart condition with the diaphragm in tension.

21 Claims, 5 Drawing Sheets

SEGMENTED BEAM AIRCRAFT PASSENGER SEAT

TECHNICAL FIELD AND BACKGROUND OF THE INVENTION

This invention relates to an aircraft passenger seat. Aircraft passenger seats are typically constructed from modular components, the size, weight and construction of which are dictated by many considerations, including fuselage dimensions, aesthetic and safety considerations. Many of these requirements are imposed by law or regulation. The lower seat chassis is constructed of leg modules, while the upper seat is constructed of section assembly modules. In prior art seating systems the leg modules and section assembly modules are connected by mounting both to a pair of parallel beams that extend laterally from one side of the seat or seat assembly to the other. This arrangement of the supporting structure of the seat increases the seat's weight and limits the available space for passengers.

Accordingly, there is a need for a passenger seat that has enhanced space, simplified design, and lighter weight.

SUMMARY OF THE INVENTION

The above-mentioned need is meet by the present invention, which in one embodiment provides a beam for a passenger seat, comprising a hollow body having a first end defining a first cross-section for being mounted to a first seat frame, a second end defining a second cross-section for being mounted to a second spaced-apart seat frame, and a central portion disposed between the first and second ends and defining a central cross-section for being mounted to a seat base disposed centrally below the first and second seat frames. The body is curved such that the central portion is laterally downwardly offset from the first and second ends.

According to another embodiment of the present invention, the first, second, and central cross-sections of the beam are generally oval.

According to another embodiment of the present invention, the first and second cross-sections of the beam comprise a plurality of sides and the central cross-section is generally oval.

According to another embodiment of the present invention, the body fo the beam comprises carbon fibers.

According to another embodiment of the present invention, a metallic cellular truss core material is disposed in the body of the beam.

According to another embodiment of the present invention, the body of the beam comprises aluminum.

According to another embodiment of the present invention, the body of the beam comprises an amorphous alloy.

According to another embodiment of the invention, a passenger seat frame assembly comprises first and second spaced-apart seat frames, each of the seat frames defining a curved shape corresponding to the profile of an anatomically-appropriate seat bottom and defining first and second beam mounting points respectively. A seat base is provided for being attached to a supporting surface, the seat base having a central beam mounting point disposed centrally between and lower than the first and second beam mounting points. A beam comprises a hollow body having a first end defining a first cross-section, a second end defining a second cross-section, and a central portion disposed between the first and second ends and defining a central cross-section. The body is curved such that the central portion is laterally downwardly offset from the first and second ends, and the first end is attached to the first beam mounting point, the second end is attached to the second mounting point, and the central portion is attached to the central beam mounting point.

According to another embodiment of the invention, a passenger seat comprises first and second spaced-apart seat frames, each of the seat frames defining a curved shape corresponding to the profile of an anatomically-appropriate seat bottom and defining first and second beam mounting points respectively. A seat base is provided for being attached to a supporting surface, the seat base having a central beam mounting point disposed centrally between and lower than the first and second beam mounting points. A beam comprises a hollow body having a first end defining a first cross-section, a second end defining a second cross-section, and a central portion disposed between the first and second ends and defining a central cross-section. The body is curved such that the central portion is laterally downwardly offset from the first and second ends, and the first end is attached to said first beam mounting point, the second end is attached to the second mounting point, and the central portion is attached to the central beam mounting point. A diaphragm is positioned under tension between the first and second seat frames for providing a continuous seat bottom and seat back support surface for a seat occupant.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DESCRIPTION OF THE PREFERRED EMBODIMENT AND BEST MODE

Figure 1:
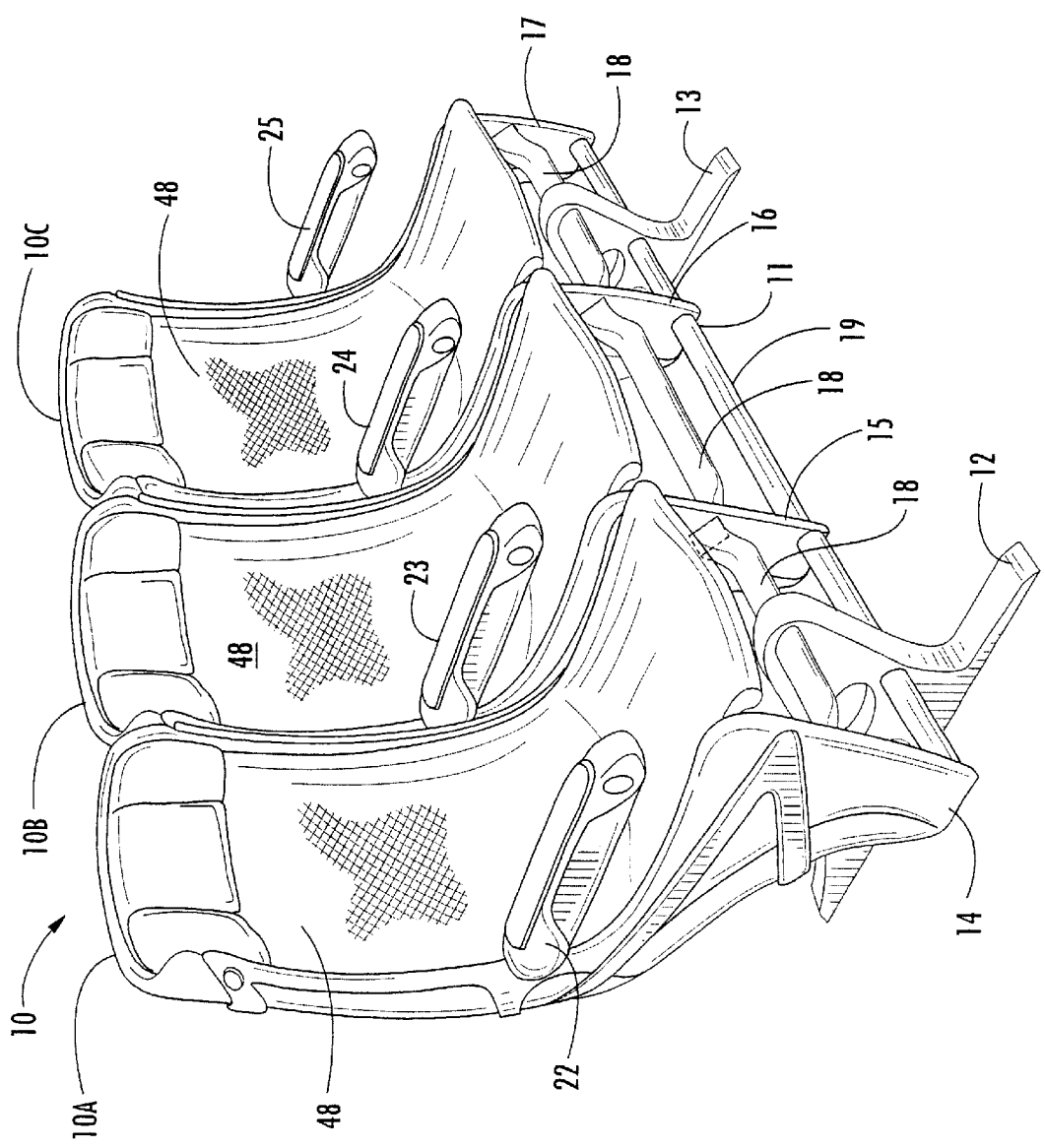
FIG. 1 is a perspective view of a three-seat assembly according to a preferred embodiment of the invention.
Figure 2:
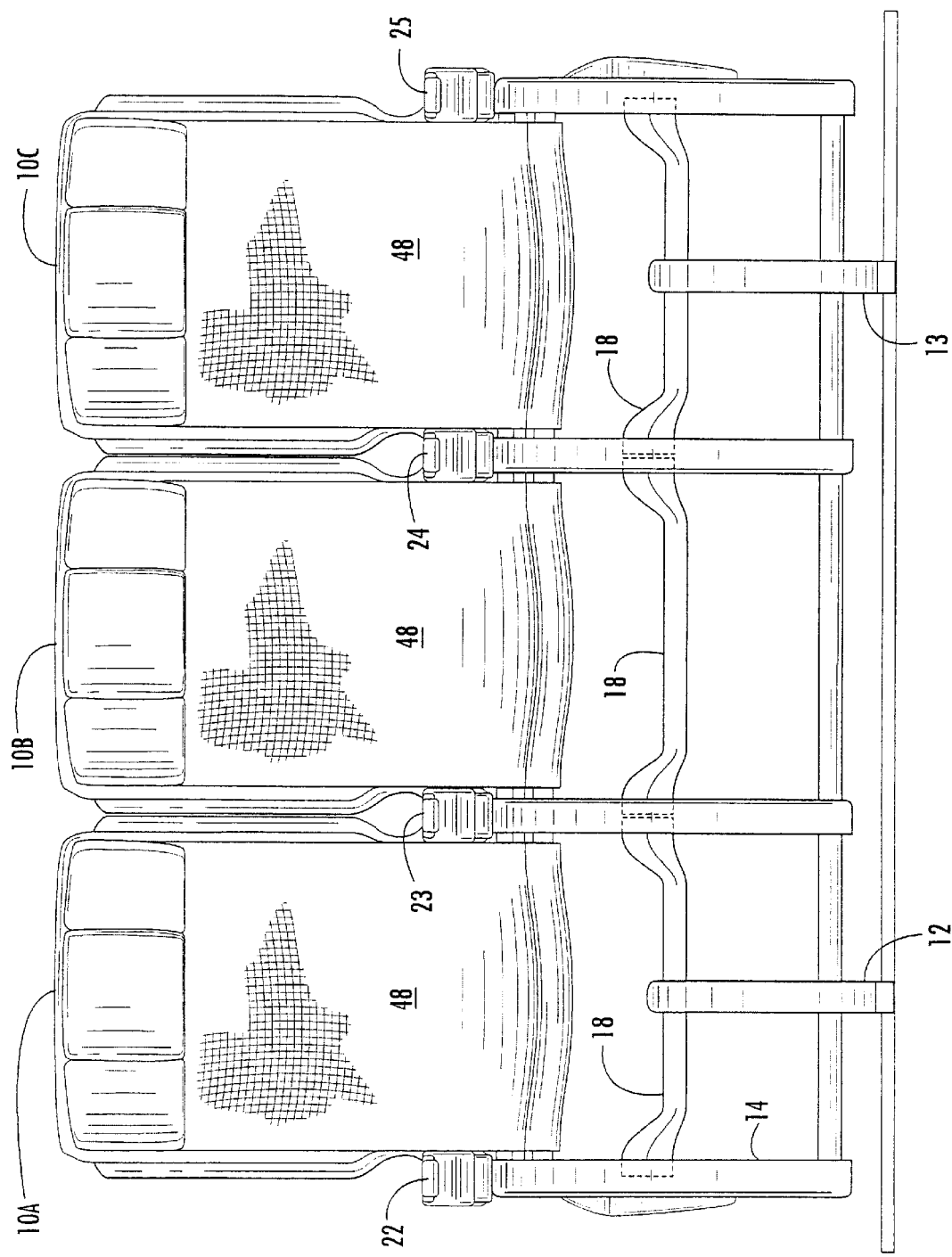
FIG. 2 is front view of the seat assembly shown in FIG. 1.

Referring now specifically to the drawings, a three-seat set according to the present invention is illustrated in FIG. 1 and shown generally at reference numeral 10 and comprises individual joined seats 10A, 10B, 10C that may be of the type that are movable from an upright to a recline position without encroaching on an aft-seated passenger. This type of seating is conventionally referred to as "coach" or "main cabin" seating as distinct from larger and more complex first class or business class seating. As will be seen below, the features of this invention are also applicable to first and business class seating. The seat set 10 includes a seat base 11. The seat base 11 includes a pair of leg assemblies 12 and 13 for being attached to a supporting surface by means of conventional track fittings such as disclosed in applicant's U.S. Pat. Nos. 4,776,533; 5,169,091 and 5,871318. Four seat frames 14, 15, 16 and 17 are connected by single laterally-extending beam 18. A baggage guard rail 19 prevents baggage stowed under the seats 10A, 10B, 10C from sliding forward into the leg area of the passengers.

The beam 18 represents a radical departure from conventional seat design, where a pair of parallel fore-and aft beams provide support to the entire seat structure. Each beam 18 is oval in cross-section and downwardly curved laterally across the front of each of the seats 10A, 10B, 10C. This combination of the oval cross-section and the curve provides sufficient strength to support the entire on the leg assemblies 12 and 13, thus eliminating the need for a second beam. Furthermore, the use of several individual beams 18 for each seat increases eases the installation of the seat beam 18 because each end need only be inserted into the associated seat frame, unlike a continuous beam extending across the entire seat set 10. This allows the use of a relatively wide, flat displaced seat portion (described in more detail below) which minimizes the intrusion into the passenger seating area.

Each seat 10A, 10B, 10C thus includes a pair of the shared, laterally spaced-apart seat frames 14, 15, 16 and 17, each of which has a curved shape generally corresponding to the profile of an anatomically-appropriate generally horizontal seat bottom and generally vertical seat back, and includes an extension to the floor. Arm rests 22, 23, 24 and 25 are pivotally-mounted on respective seat frames 14, 15, 16 and 17.

Each of the seats 10A, 10B, 10C, has a diaphragm 48 in the form of a fabric seat suspension material. The material 48 provides a seating surface and is stretched under tension onto curved, semi-rigid diaphragm supports (not shown) which are carried by seat frames in alignment with the curved shape of the seat frames.

Figure 3:
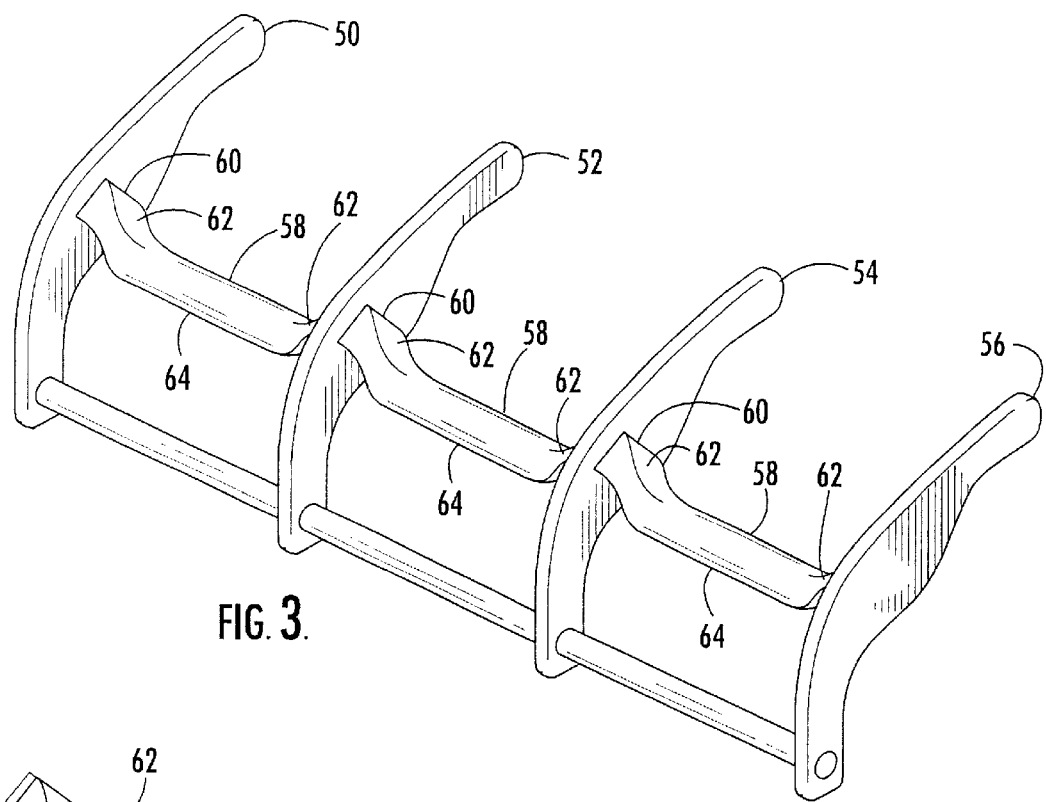
FIG. 3 is a perspective view of a portion of a seat frame assembly according to a preferred embodiment of the invention.

FIG. 3 shows a perspective view of a portion of a seat frame assembly. The seat frame assembly includes first, second, third, and forth spaced-apart seat frames labeled 50, 52, 54 and 56, respectively. A tubular, curved beam 58 extends between each pair of seat frames. The beams 58 are received in mounting points which are defined by openings 60 formed in the seat frames. The beams 58 are similar in construction to the beams described above. Each beam includes a plurality of spaced-apart mounting portions 62. A seat portion 64 is disposed between the mounting portions 62. The beams 58 are curved such that seat portion 64 is laterally downwardly offset from the mounting portions 62. The beams 58 may be secured to the seat frames by any known method, for example by interference fit, welding, or adhesives.

Figure 4:
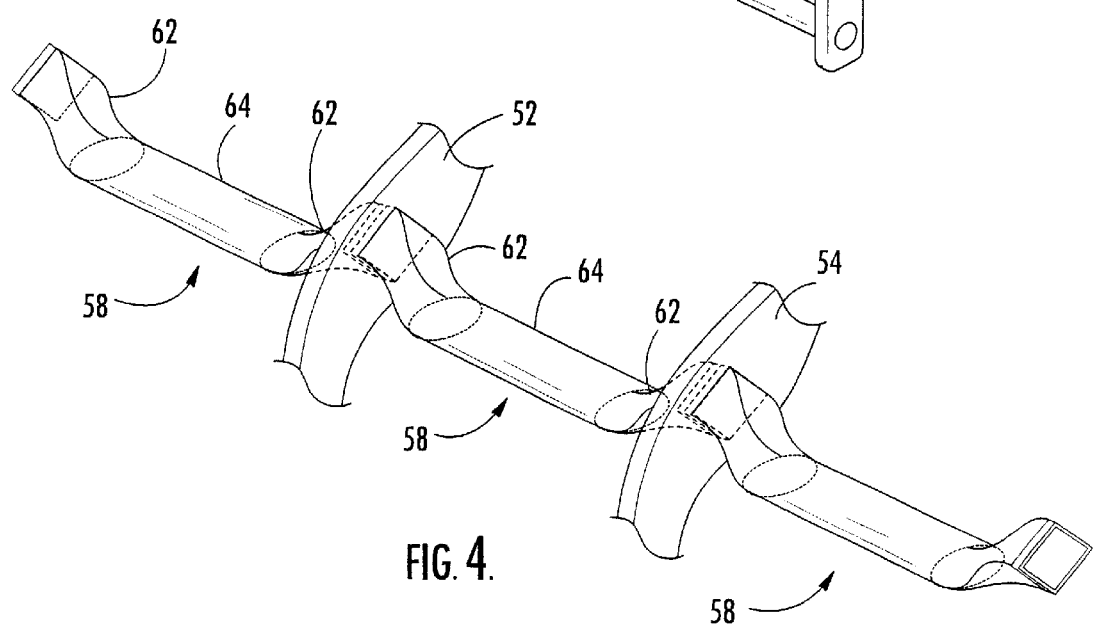
FIG. 4 is an enlarged perspective view of a portion of the frame assembly of FIG. 3.

FIG. 4 shows an enlarged view of the beams 58 of FIG. 3. The beams 58 each comprise a body having a hollow interior. The body may be constructed of a material selected to give adequate strength and low weight, for example a carbon-fiber containing composite material To increase the strength and stiffness of the beam 58, a low-density filler may be disposed inside the hollow body. One suitable filler is a metallic cellular truss core material (not shown), the cellular truss core material may be of a known type comprising a three-dimensional matrix of struts connected at nodes to create a low-density structural material. The cellular truss core material may be joined to the inner surface of the beam 58, for example with an adhesive. It is also possible that the beam 58 be left hollow and made of a different material, such as aluminum.

The beam 58 may also be constructed of an amorphous alloy of a known type. An amorphous alloy is an alloy which is glass-like in structure, lacking a crystalline lattice. Amorphous alloys have certain advantages over conventional alloys, for example they are capable of exhibiting yield strength greater than titanium, while having a weight and cost similar to aluminum. Amorphous alloys are resistant to work hardening and they can be formed into complex shapes in a manner similar to injection molding. One example of a suitable amorphous alloy has the following approximate composition, in weight percent: 41.2 Zirconium, 22.5 beryllium, 13.8 titanium, 12.5 copper, nickel 10.0. Such alloys are available from Liquidmetal Technologies, Tampa, Fla. 33602 USA.

Figure 7:
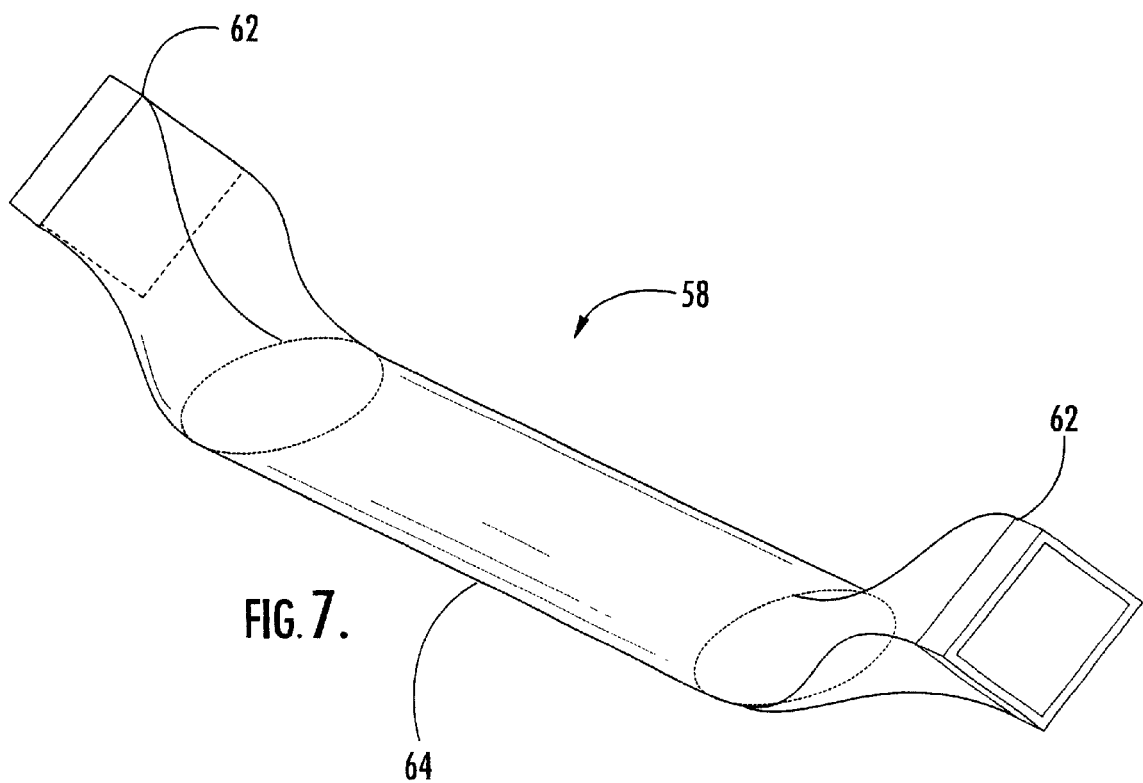
FIG. 7 is a perspective view of a seat beam according to an alternative embodiment of the invention.

The shape of the beam 58 may be such that the seat portion 64 is generally straight and a relatively short S-shaped or double-curved transition is provided between the seat portion and each mounting portion in order to offset the seat portion 64 by the required amount. This beam shape is shown in larger scale in FIG. 7.

Figure 5:
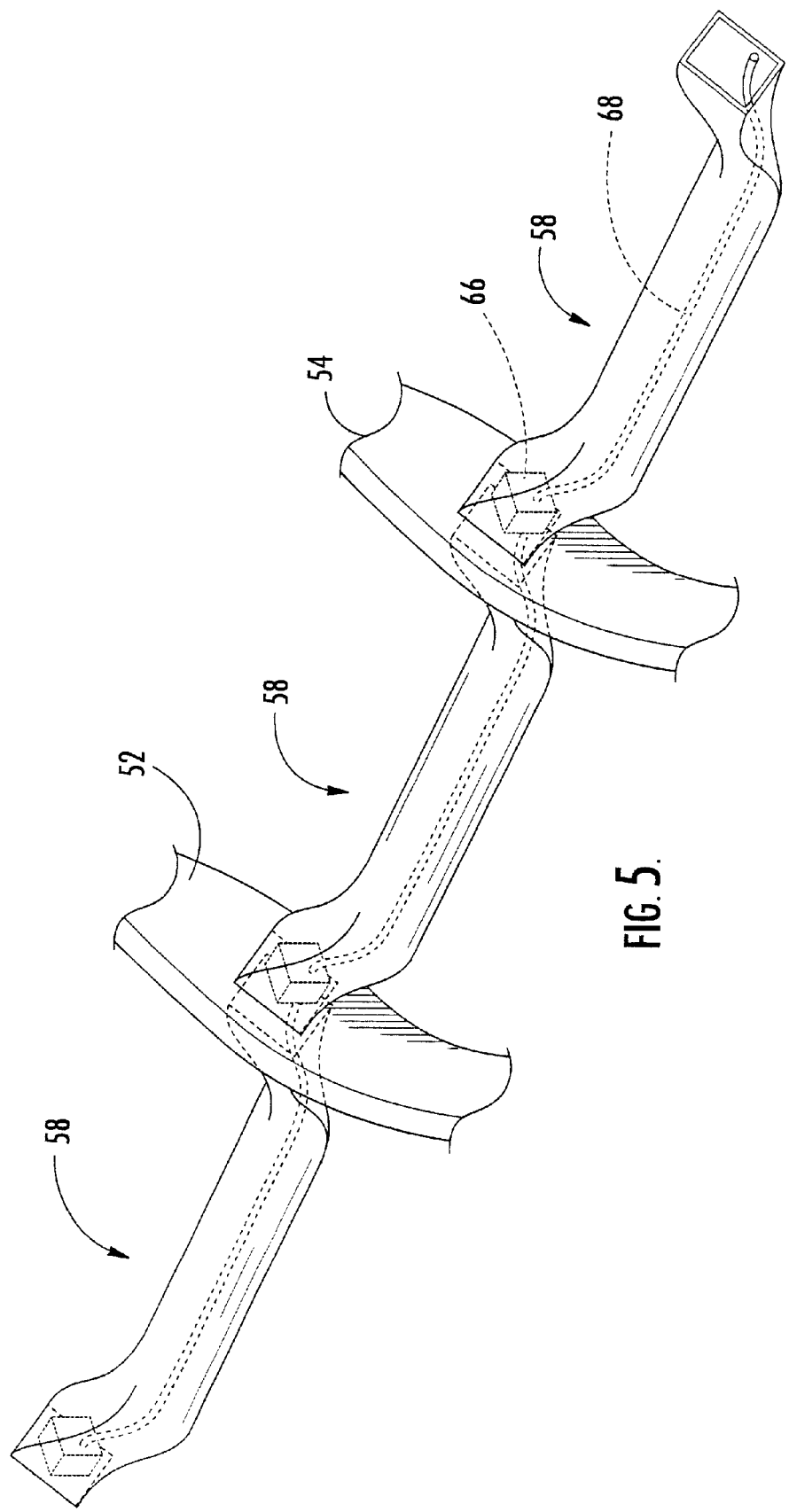
FIG. 5 is a view similar to FIG. 4 showing a beam having electronic components disposed therein.

FIG. 5 shows another view of the frame assembly shown in FIG. 4. As illustrated, electrical components including one or more seat electronics units 66 are disposed inside the beam 58, as shown at the cut-away sections in the Figure. The seat electronics units 66 may contain electronic components associated with in-flight entertainment (IFE) equipment or other passenger-accessible electronics. Typically, one seat electronics unit 66 is provided for each seat 10A, 10B, and 10C. The housing of the seat electronics units 66 are sized and shaped to fit into the interior of the beam. The seat electronics units 66 may be electrically connected to each other or to aircraft circuits with appropriate cabling 68.

Figure 6:
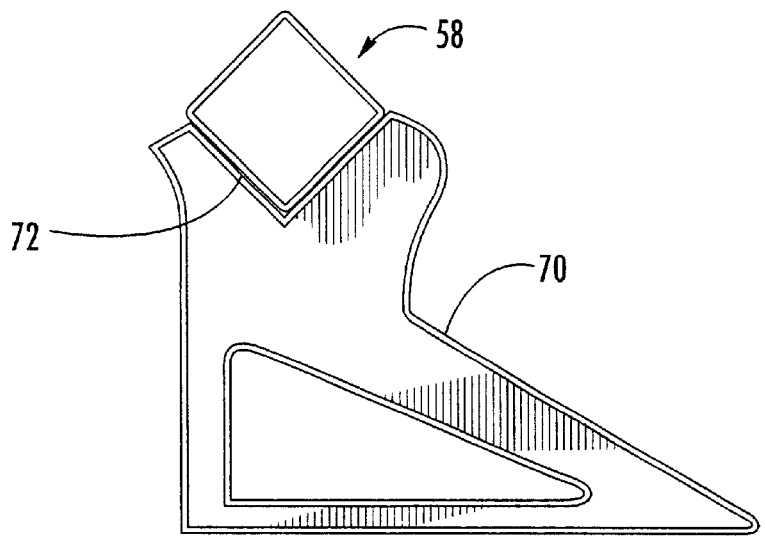
FIG. 6 is a side elevation view showing a portion of a seat frame assembly and a seat beam according to an alternative embodiment of the invention.

FIG. 6 shows an alternate embodiment of a seat assembly in which 4-sided polygonal ends of the beam 58 are received in seat frames 70 having complimentary V-shaped openings 72 formed therein. The beam 58 may then be secured to the seat frames 70 by welding or adhesives, for example.

A passenger seat is described above. Various details of the invention may be changed without departing from its scope. Furthermore, the foregoing description of the preferred embodiment of the invention and the best mode for practicing the invention are provided for the purpose of illustration only and not for the purpose of limitation the invention being defined by the claims.

I claim:

1. A beam for a passenger seat, comprising:
   a hollow body having a first end defining a first cross-section for being mounted to a first seat frame, a second end defining a second cross-section for being mounted to a second spaced-apart seat frame, and a central portion disposed between said first and second ends and defining a central cross-section for being mounted to a seat base disposed centrally below said first and second seat frames, said body being curved such that said central portion is laterally downwardly offset from said first and second ends, wherein said first and second cross-sections comprise a plurality of sides and said central cross-section is generally oval.

2. The beam according to claim 1, wherein said body comprises aluminum.

3. The beam according to claim 1, wherein said body comprises an amorphous alloy.

4. The beam according to claim 1, wherein said body comprises carbon fibers.

5. The beam according to claim 1, wherein a metallic cellular truss core material is disposed in said body.

6. A passenger seat frame assembly comprising:

first and second spaced-apart seat frames, each of said seat frames defining a curved shape corresponding to a profile of an anatomically-appropriate seat bottom and defining first and second beam mounting points respectively;

a seat base for being attached to a supporting surface, said seat base having a central beam mounting point disposed centrally between and lower than said first and second beam mounting points; and a beam comprising a hollow body having a first end defining a first cross-section, a second end defining a second cross-section, and a central portion disposed between said first and second ends and defining a central cross-section, wherein said body is curved such that said central portion is laterally downwardly offset from said first and second ends, and wherein said first end is attached to said first beam mounting point, said second end is attached to said second beam mounting point, and said central portion is attached to said central beam mounting point.

7. The beam according to claim 6, wherein said body comprises an amorphous alloy.

8. The passenger seat frame assembly of claim 6, wherein said first beam mounting point comprises an opening having a shape complementary to said first cross-section of said beam, and said second beam mounting point comprises an opening having a shape complementary to said second cross-section of said beam.

9. The passenger seat frame assembly according to claim 6, wherein said first, second, and central cross-sections of said beam are generally oval.

10. The passenger seat frame assembly according to claim 6, wherein said first and second cross-sections of said beam comprise a plurality of sides and said central cross-section is generally oval.

11. The passenger seat frame assembly according to claim 6, wherein said body of said beam comprises carbon fibers.

12. The passenger seat frame assembly according to claim 6, wherein a metallic cellular truss core material is disposed in said body of said beam.

13. The passenger seat frame assembly according to claim 6, wherein said body of said beam comprises aluminum.

14. A passenger seat comprising:

first and second spaced-apart seat frames, each of said seat frames defining a curved shape corresponding to a profile of an anatomically-appropriate seat bottom and defining first and second beam mounting points respectively;

a seat base for being attached to a supporting surface, said seat base having a central beam mounting point disposed centrally between and lower than said first and second beam mounting points;

a beam comprising a hollow body having a first end having a first cross-section, a second end having a second cross-section, and a central portion disposed between said first and second ends and having a central cross-section, wherein said body is curved such that said central portion is laterally downwardly offset from said first and second ends, and wherein said first end is attached to said first beam mounting point, said second end is attached to said second mounting point, and said central portion is attached to said central beam mounting point; and a diaphragm positioned under tension between said first and second seat frames for providing a continuous seat bottom and seat back support surface for a seat occupant.

15. The beam according to claim 14, wherein said body comprises an amorphous alloy.

16. The passenger seat frame assembly of claim 14, wherein said first beam mounting point comprises an opening having a shape complementary to said first cross-section of said beam, and said second beam mounting point comprises an opening having a shape complementary to said second cross-section of said beam.

17. The passenger seat frame assembly according to claim 14, wherein said first cross-section, said second cross-section, and said central cross-section of said beam are all generally oval.

18. The passenger seat frame assembly according to claim 14, wherein said first and second cross-sections of said beam comprise a plurality of sides and said central cross-section is generally oval.

19. The passenger seat frame assembly according to claim 14, wherein said body of said beam comprises carbon fibers.

20. The passenger seat frame assembly according to claim 14, wherein a metallic cellular truss core material is disposed in said body of said beam.

21. The passenger seat frame assembly according to claim 14, wherein said body of said beam comprises aluminum.

* * * * *